US012693629B2

(12) United States Patent
Lee et al.

(10) Patent No.: US 12,693,629 B2
(45) Date of Patent: Jul. 28, 2026

(54) METHOD AND APPARATUS FOR RECORDING DIGITAL HOLOGRAPHIC PORTRAIT PHOTOGRAPH USING NEURAL NETWORK IMAGE INTERPOLATION

(71) Applicant: KWANGWOON UNIVERSITY INDUSTRY-ACADEMIC COLLABORATION FOUNDATION, Seoul (KR)

(72) Inventors: Seunghyun Lee, Namyangju-si (KR); Leehwan Hwang, Incheon (KR); Soonchul Kwon, Seoul (KR); Philippe Gentet, Seoul (KR); Yves Gentet, Saint-Aubin-de-Medoc (FR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 395 days.

(21) Appl. No.: 18/470,115

(22) Filed: Sep. 19, 2023

(65) Prior Publication Data
US 2024/0361728 A1 Oct. 31, 2024

(30) Foreign Application Priority Data

Apr. 26, 2023 (KR) ........................ 10-2023-0054503
Jun. 19, 2023 (KR) ........................ 10-2023-0078049

(51) Int. Cl.
 *G03H 1/26* (2006.01)
 *G03H 1/04* (2006.01)
(52) U.S. Cl.
 CPC ........... *G03H 1/268* (2013.01); *G03H 1/0443* (2013.01)

(58) Field of Classification Search
 CPC .... G03H 1/268; G03H 1/0443; G03H 1/0476; G03H 1/0808; G03H 2210/42;
 (Continued)

(56) References Cited

U.S. PATENT DOCUMENTS

| | | | |
|---|---|---|---|
| 6,990,228 B1 * | 1/2006 | Wiles ........................ | G06T 7/55 348/42 |
| 2015/0212489 A1 * | 7/2015 | Seo ........................ | G03H 1/0808 359/9 |
| 2017/0295358 A1 * | 10/2017 | Cabral ................. | H04N 17/002 |

FOREIGN PATENT DOCUMENTS

| | | |
|---|---|---|
| JP | 9-113846 A | 5/1997 |
| KR | 10-2015-0090540 A | 8/2015 |
| KR | 10-2207736 B1 | 1/2021 |

OTHER PUBLICATIONS

Office Action for KR 10-2023-0078049 by Korean Intellectual Property Office dated Aug. 23, 2024.
(Continued)

*Primary Examiner* — William A Beutel
(74) *Attorney, Agent, or Firm* — BROADVIEW IP LAW, PC

(57) ABSTRACT

Provided is a method of recording a digital holographic portrait photograph, which is performed by an apparatus for recording a digital holographic portrait photograph, the method including the steps of: (a) performing a preliminary test using a plurality of cameras arranged at a specific rotation angle; (b) determining a maximum allowable angle between the cameras through the preliminary test; (c) acquiring a plurality of images using the plurality of cameras arranged at the maximum allowable angle; and (d) interpolating the plurality of images to record a holographic portrait photograph.

9 Claims, 5 Drawing Sheets

(58) Field of Classification Search
CPC .. G03H 2210/441; G03H 1/02; G06V 40/166;
G06V 2201/12; G06N 3/02
See application file for complete search history.

(56) References Cited

OTHER PUBLICATIONS

Taylor, R. (Feb. 2013). "A Curious Conundrum; The state of holographic portraiture in the 21st century." J. Phys .: Conf. Ser. 415 012004.

Lucente, M. (1994) "Diffraction-specific fringe computation for electro holography." Ph.D. diss., Massachusetts Institute of Technology.

Gentet, Y. et al. (2019). "Chimera, a new holoprinter technology combining low-power continuous lasers and fast printing." Appl. Opt., 58, G226-G230. 10.1364AO.58.

Gentet, P. et al. (Feb. 2017). "Ultimate 04 the new reference for ultra-realistic color holography." Dept. of Plasma Bio Display, Kwangwoon University; Ultimate Holography; Dept. of Information Contents, Kwangwoon University.

Abiodun, O. I. et al. (2018). "State-of-the-art in artificial neural network applications A survey." Heliyon, 4(11), e00938.

Gentet, P. et al. (Mar. 2023). "An in-house-designed scanner for Chimera holograms." In Practical Holography XXXVII Displays, Materials, and Application.

Jiang, H. et al. "Sense; a shared encoder network for scene-flow estimation." UMass Amherst; NVIDIA; Georgia Tech.

Lee, H., Kim et al. "AdaCoF adaptive collaboration of flows for video frame interpolation." Yonsei University; Agency for Defense Development.

Reda, F. et al. (2022). "Film Frame interpolation for large motion." Google Research. University of Washington.

Dabbish, L. et al. (2012, February). "Social coding in GitHub transparency and collaboration in an open software repository." School of Computer Science and Center for the Future of Work, Heinz College, Carnegie Mellon University.

* cited by examiner (a) (b)

200

TEST PERFORMER — CONTROLLER — HOLOGRAM RECORDER 210 230 220

(a)             (b)

(a)

(b)

(a)

(b)

METHOD AND APPARATUS FOR RECORDING DIGITAL HOLOGRAPHIC PORTRAIT PHOTOGRAPH USING NEURAL NETWORK IMAGE INTERPOLATION

CROSS-REFERENCE TO RELATED APPLICATION

This application claims priority to and the benefit of Korean Patent Application No. 10-2023-0054503 and 10-2023-0078049, filed in the Korean Intellectual Property Office on Apr. 26, 2023 and Jun. 19, 2023, respectively, the entire contents of which are incorporated herein by reference.

BACKGROUND

1. Field of the Invention

The present invention relates to a technology of recording a digital holographic portrait photograph and, more specifically, to a method and apparatus for recording a ultra-realistic, full color, and full parallax snapshot digital holographic portrait using a plurality of synchronized cameras and a neural network image interpolation.

2. Discussion of Related Art

Currently, the most accurate method of representing a portrait photograph is a pulse holographic portrait. A pulse portrait is a hologram recorded using doubled neodymium in a frequency (green) pulse laser or a high-energy (several joules) ruby (red) laser, which may enable a live object in a darkroom to be recorded with a very short exposure time of about 20 ns. An originally recorded transmission master hologram H1 may be typically transmitted at 40 degrees and 30 degrees with respect to the horizontal axis and the vertical axis, respectively, to acquire a second reflection hologram H2 of a scale of 1:1 with a limited full parallax, and the holograms may be observed with white light. However, the techniques requiring heavy and expensive equipment and hologram technology has almost disappeared. Also, in the case of visually impressive 3D effects, a major obstacle to success is the final solid color of the hologram, in which a green or red often makes the holographic portrait of ordinary people appear lifeless or ghostly.

CHIMERA recordings require prior acquisition of a series of perspective images. Referring to FIG. 1, portrait recording is generally obtained by rotating a camera around a subject along an arc-curved rail guide, as shown in FIG. 1A, or using a fixed camera with a subject positioned on a turntable as shown in FIG. 1B. The vertical axis of rotation is the vertical axis of the final hologram and everything in front of the axis is derived from the image. For aesthetic reasons, the axis is usually positioned at the eye level. For a successful recording, the model should keep his or her head still during the capturing process, and the relative movement of the camera should be ignored. Unlike the pulsed laser technology, the portrait recording is not instantaneous and lasts for about 30 seconds, during which the subject generally has difficulty in remaining motionless at the eye level, which results in an unnatural final result. Also, the acquired portrait has only a horizontal parallax.

RELATED ART DOCUMENTS

Patent Document

Korean Registered Patent No. 10-2207736

SUMMARY OF THE INVENTION

The present invention is directed to providing a method and apparatus for recording a digital holographic portrait photograph that are capable of recording an immersive hologram while limiting the number of cameras used as much as possible, through a digital CHMERA, holographic, or stereogram technology combined with image interpolation using a neural network.

The present invention is directed to providing a method and apparatus for recording a digital holographic portrait photograph that are capable of recording an instantaneous full-color hologram stereogram portrait using a plurality of synchronized cameras through a method of interpolating images using a neural network.

The technical objectives of the present invention are not limited to the above, and other objectives may become apparent to those of ordinary skill in the art based on the following descriptions.

According to a first aspect of the present invention, there is disclosed a method of recording a digital holographic portrait photograph, which is performed by an apparatus for recording a digital holographic portrait photograph, the method including the steps of: (a) performing a preliminary test using a plurality of cameras arranged at a specific rotation angle; (b) determining a maximum allowable angle between the cameras through the preliminary test; (c) acquiring a plurality of images using the plurality of cameras arranged at the maximum allowable angle; and (d) interpolating the plurality of images to record a holographic portrait photograph.

The step (a) may include performing the preliminary test using a 3D computer-generated image head model having a rotation angle in a range of 5° to 60° and a 3D computer graphics program.

The step (a) may include: generating interpolated images while changing a rotation angle between frames of two adjacent cameras among the plurality of cameras; and generating acquired images for each rotation angle using the interpolated images.

The step (b) may include: comparing pixel colors between the acquired image and an actual image; converting a color of an area in which a difference in pixel colors in the acquired image and the actual image is greater than or equal to a preset reference to a specific color; calculating an accuracy of the acquired image; and determining the maximum allowable angle between the two adjacent cameras based on the area converted to the specific color and the accuracy.

The maximum allowable angle may be 20°.

In the step (c), the plurality of cameras may be separated at the maximum allowable angle in a range of a specific arc angle to be arranged in a horizontal direction or to be arranged in a vertical direction.

The step (d) may include: acquiring images from the plurality of cameras arranged in the horizontal direction; interpolating the acquired images to generate horizontally interpolated images between the images; and recording a half-parallax digital holographic portrait photograph using the horizontally interpolated images.

The step (d) may include: acquiring images from the plurality of cameras arranged in the vertical direction; interpolating the acquired images to generate vertically interpolated images between the images; and recording a full-parallax digital holographic portrait photograph using the vertically interpolated images and the horizontally interpolated images.

According to a second aspect of the present invention, there is disclosed an apparatus for recording a digital holographic portrait photograph, the apparatus including: a test performer configured to perform a preliminary test using a plurality of cameras arranged at a specific rotation angle, and determine a maximum allowable angle between cameras through the preliminary test; and a hologram recorder configured to acquire a plurality of images using the plurality of cameras arranged at the maximum allowable angle, and interpolate the plurality of images to record a holographic portrait photograph.

According to a third aspect of the present invention, there is disclosed a computer program recorded in a computer readable medium, which performs the method of recording a digital holographic portrait photograph when instructions of the computer program are executed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
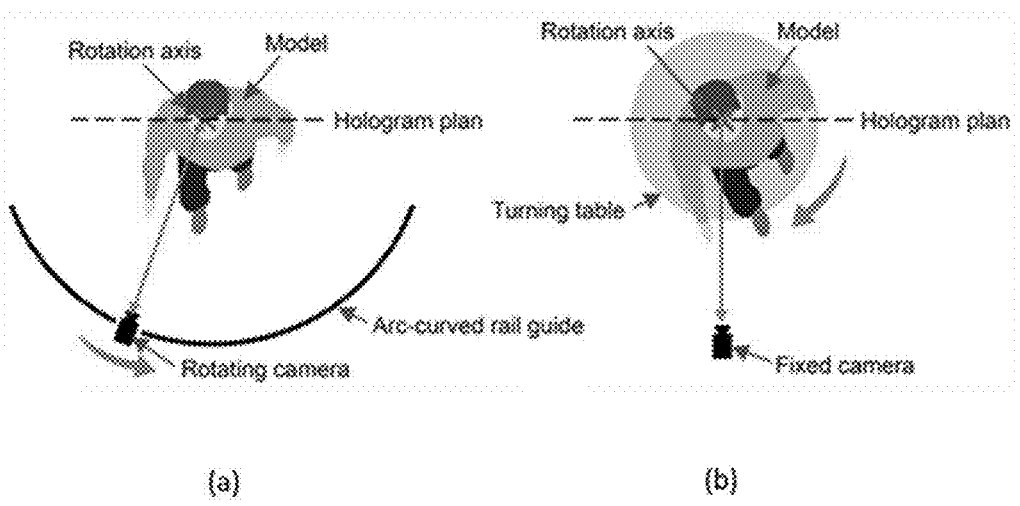
FIG. 1 is an exemplary diagram for describing a method of obtaining a perspective view for recording a holographic portrait photograph.

Hereinafter, advantages, features, and ways to achieve them will become readily apparent with reference to descriptions of the following detailed embodiments when considered in conjunction with the accompanying drawings. However, the scope of the present invention is not limited to such embodiments, and the present invention may be embodied in various forms. The embodiments to be described below are only embodiments provided to complete the disclosure of the present invention and help those skilled in the art to completely understand the scope of the present invention, and the present invention is defined only by the scope of the appended claims. Like reference numerals are used to designate like elements through the specification. The term "and/or" includes any combination of a plurality of recited items or any of a plurality of recited items.

In the present disclosure, terms such as "first" and "second" are used only for the purpose of describing various elements, components and/or sections, but do not limit the elements, components and/or sections. Terms such as "first" and "second" are used only for the purpose of distinguishing one element, one component or one section from other elements, other components or other sections. Accordingly, within the scope of the present disclosure, a first element, a first component, or a first section may be referred to as a second element, a second component, or a second section.

In each operation, the identification code (e.g., a, b, c, etc.) is used for convenience of description, the identification code does not describe the order of the operations, and each operation may occur in a different order from the specified order unless a specific order is clearly described in the context. That is, each operation may occur in the same order as specified, may be performed substantially simultaneously, or may be performed in reverse order.

Terms used herein are used for describing the embodiments and are not intended to limit the scope and spirit of the present invention. It should be understood that the singular forms "a" and "an" in addition include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Unless otherwise defined, all terms (including technical and scientific terms) used herein have the same meanings as commonly understood by those of ordinary skill in the art to which this invention belongs. It should be further understood that terms, such as those defined in commonly used dictionaries, should not be interpreted in an idealized or overly formal sense unless expressly defined herein specifically.

In the following description of embodiments of the present disclosure, when it is determined that a detailed description of a known structure or function obscures the subject matter of the present disclosure, the detailed description will be omitted. Although terms used herein are selected from among general terms that are currently and widely used in consideration of functions in the exemplary embodiments, these may be changed according to intentions or customs of those skilled in the art or the advent of new technology. Therefore, the meanings of the terms used herein should be interpreted based on substantial meanings of the terms and content of this entire specification, rather than simply the terms themselves.

Figure 2:
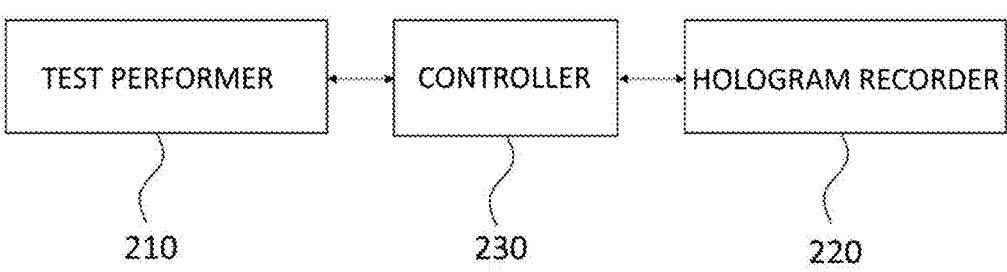
FIG. 2 is a block diagram illustrating an apparatus for recording a digital holographic portrait photograph according to an exemplary embodiment of the present invention.

FIG. 2 is a block diagram illustrating an apparatus for recording a digital holographic portrait photograph according to an exemplary embodiment of the present invention.

An apparatus 200 for recording a digital holographic portrait photograph (hereinafter referred to as a "recording apparatus") is an apparatus for performing a method of recording a digital holographic portrait photograph, and records a digital holographic portrait photograph from a limited number of cameras through frame interpolation of synthesizing intermediate photographs between two input images. Preferably, the recording apparatus 200 may record a digital holographic portrait photograph by combining image interpolation using a neural network with digital CHIMERA, holographic, or stereogram printing technology.

Preferably, the recording apparatus 200, which is a computer on which an application or program for performing a method of recording a digital holographic portrait photograph is installed, may execute the installed application or program, and may be provided with a user interface such that input and output of data are controlled. Here, a computer refers to all types of hardware devices including at least one processor, and may be understood as encompassing software components operating in the corresponding hardware devices according to embodiments. For example, a computer may be understood as including a smartphone, a tablet personal computer (PC), a desktop computer, a laptop computer, and user clients and applications running on each device, but it is not limited thereto.

Referring to FIG. 2, the recording apparatus 200 includes a test performer 210, a hologram recorder 220, and a controller 230. Here, the controller 230 controls the operation and the flow of data of the test performer 210 and the hologram recorder 220.

The test performer 210 performs a preliminary test to determine parameters for shooting and determine environmental conditions for building a shooting studio. Since interpolation is not smooth as the angle between two images is greater, the test performer 210 may determine the maximum allowable angle between two adjacent cameras by performing a preliminary test. For example, the test performer 210 may perform a preliminary test using a 3D computer-generated image (CGI) head model and Autodesk 3ds Max, which is a 3D computer graphics program.

The hologram recorder 220 records a digital holographic portrait photograph using images acquired in a shooting studio, in which a plurality of cameras are arranged, based on the maximum allowable angle determined through the test performer 210. Preferably, the plurality of cameras may be arranged in a horizontal or vertical direction according to the maximum allowable angle, and the hologram recorder 220 may record a half parallax or full parallax snapshot portrait according to the arrangement of the cameras.

An operation performed through each component of the recording apparatus 200 shown in FIG. 2 will be described in detail with reference to FIG. 3 below. Each step to be described with reference to FIG. 3 has been described as being performed by a different component, but it is not limited thereto, and at least some of the operations may be performed by the same component or different components according to embodiments.

Figure 3:
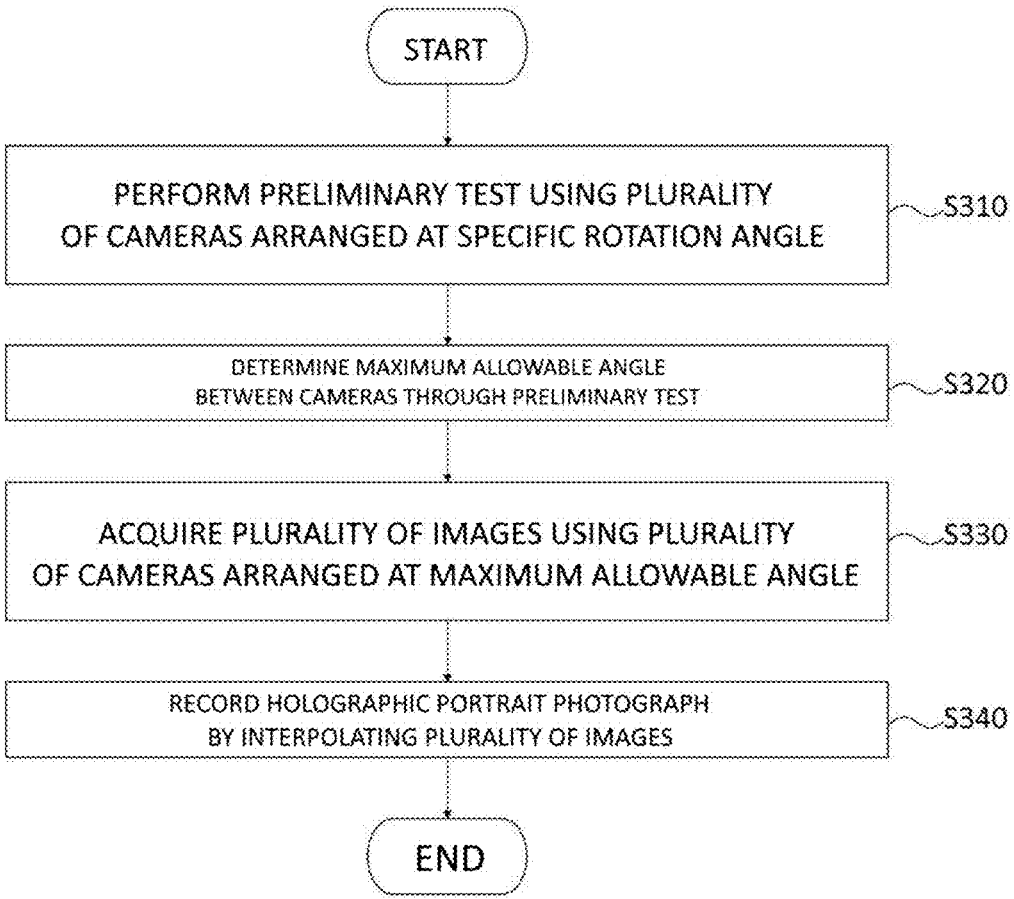
FIG. 3 is a flowchart showing a method of recording a digital holographic portrait photograph according to an embodiment.

FIG. 3 is a flowchart showing a method of recording a digital holographic portrait photograph according to an embodiment.

Referring to FIG. 3, the test performer 210 performs a preliminary test using a plurality of cameras arranged at a specific rotation angle (step S310).

Preferably, the test performer 210 may perform the preliminary test using a 3D computer-generated image head model having a rotation angle in the range of 5° to 60° and a 3D computer graphics program. More specifically, the test performer 210 may generate interpolated images while changing a rotation angle between frames of two adjacent cameras among the plurality of cameras, and generate acquired images for each rotation angle using the interpolated images. For example, the rotation angle between the two frames may be changed to 5°, 10°, 15°, 20°, 30°, or 60°. Preferably, the interpolated image is an image generated using an existing neural network image interpolation algorithm used in image processing using deep learning, and an image additionally required between actual images captured by a camera to generate a hologram of images from various viewpoints. Preferably, the interpolated image may be generated by automatic scaling, rotation, and interpolation through a neural network image interpolation algorithm.

Figure 4:
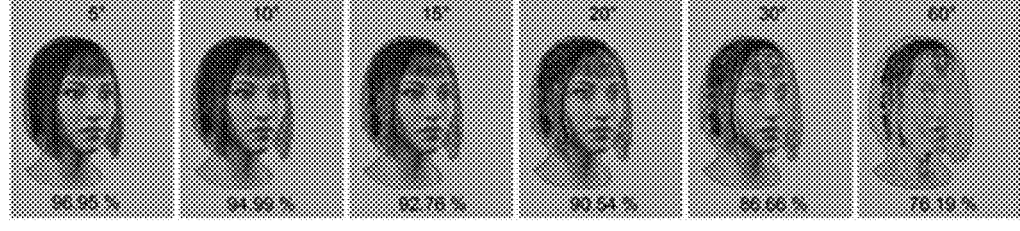
FIGS. 4 and 5 are exemplary diagrams for describing preliminary test performance according to an embodiment.

The test performer 210 determines the maximum allowable angle between cameras through the preliminary test (step S320). Preferably, the test performer 210 may compare the acquired image generated in step S310 with the actual image to determine the maximum allowable angle. More specifically, the test performer 210 may compare pixel colors of the acquired image and the actual image, and convert the color of an area, in which the difference in pixel colors in the acquired image and the actual image is greater than a preset reference, to a specific color. For example, the test performer 210 may, when a pixel has a difference in color greater than or equal to 2% from the color of the actual image in any one of the three channels R, G, and B for each pixel of the acquired image, convert the pixel to a red color. The test performer 210 may calculate an accuracy in percentage through the color conversion evaluation through color comparison between the acquired image and the actual image, and determine the maximum allowable angle between two adjacent cameras based on the area converted to a specific color and the accuracy. For example, referring to FIG. 4, it can be seen that, from a result of expressing the accuracy of the acquired image in percentage and indicating an area of the acquired image having a difference from the actual image in red, an interpolated image is reconstructed to match the actual image at a rotation angle of 20° at most. That is, it can be seen that when the rotation angle exceeds 20°, unnatural deformations appear on the face and neck, and the reconstruction is not performed to match the actual image. Therefore, the maximum allowable angle may be determined to be 20°.

Figure 5:
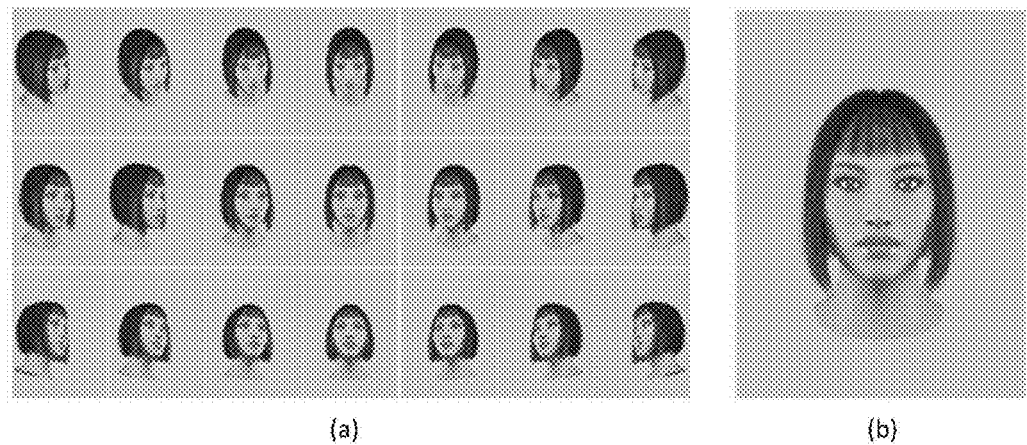

In an embodiment, the test performer 210 may test recording of a digital holographic portrait photograph by performing a test with horizontal images separated at the maximum allowable angle and a specific number of heights separated at the maximum allowable angle for an arc of a specific angle. For example, referring to FIG. 5A, the test performer 210 may perform interpolation based on seven horizontal images separated at an angle of 20° and three vertical images at heights separated at an angle of 20° for an arc of an angle of 120° to reconstruct a full color and full parallax image as shown in FIG. 5B. More specifically, when the seven horizontal images on the horizontal axis and the three vertical images on the vertical axis are referred to as reference images, 128 horizontal images and 64 vertical images may be interpolated in each of virtual quadrangles each having a corresponding one of the reference images as a vertex. That is, image interpolation may be performed by filling the surface of the quadrangle. Accordingly, since a total of 12 virtual quadrangles are generated, a total of 99,072 images corresponding to 128×64×12 may be acquired. Among the images, the number of actual images is 21, which accounts for only 0.02% of the total images, and the interpolation time for all of the images may take six hours through a high-speed graphic computer. Then, a hogel may be generated from the perspective images. Here, a hogel refers to converting a plurality of multi-viewpoint images into one holographic image. Then, the hogel is sequentially recorded on a 10×13 cm holographic plate, a 15×20 cm holographic plate, a 30×40 cm holographic plate, or a 60×80 cm U04 holographic plate with a resolution of 250 μm or 500 μm, and CHIMERA is illuminated with an RGB LED lamp at an angle of 45° and a distance of 50 cm from the center of the hologram, to generate a fine full-color and full-parallel reconstruction of a 3D CGI head. Accordingly, the unnatural deformation of some interpolated images shown in FIG. 5A does not appear in the hologram in FIG. 5B.

The hologram recorder 220 acquires a plurality of images using a plurality of cameras arranged at the maximum allowable angle (step S330). Preferably, the plurality of cameras may be separated at the maximum allowable angle to be arranged in a horizontal direction or in a vertical direction for a specific arc angle.

Figure 6:
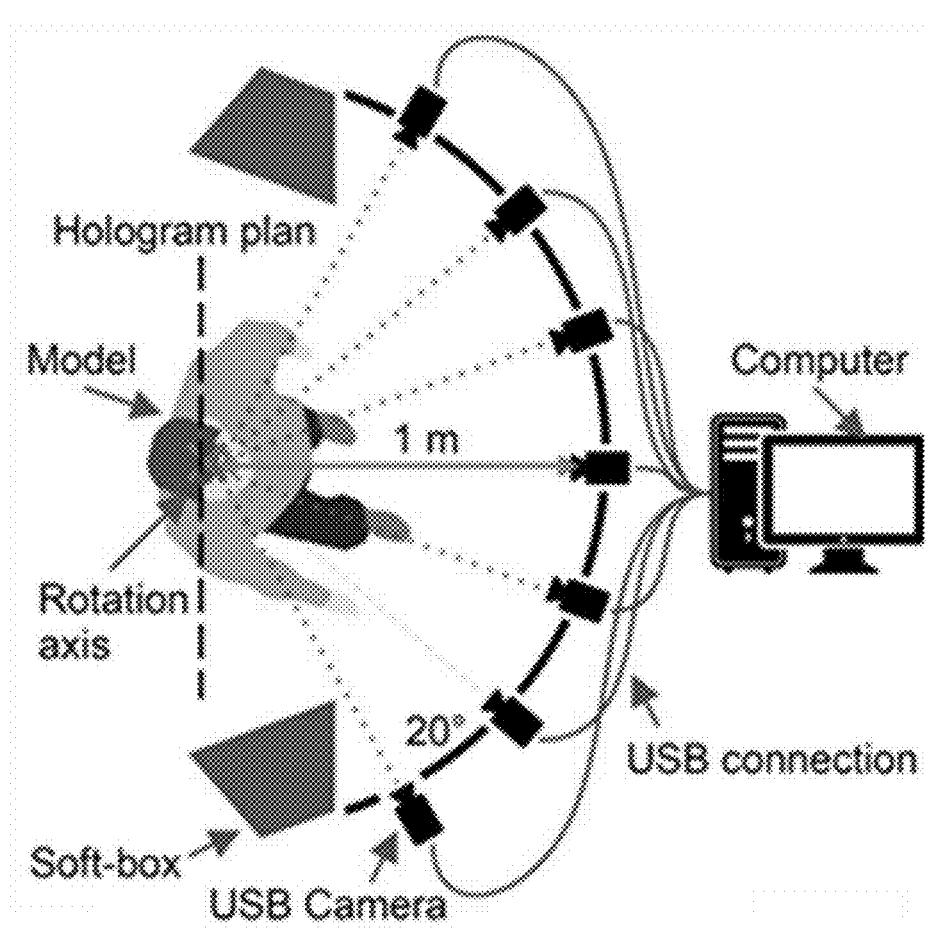
FIGS. 6 and 7 are exemplary diagrams for describing the arrangement of a plurality of cameras according to an embodiment.

More specifically, in order to acquire a half-parallax digital holographic portrait photograph, a plurality of cameras may be horizontally arranged at intervals of the maximum allowable angle at a specific distance away from the center of an arc of a specific angle as shown in FIG. 6. For example, seven cameras may be horizontally arranged at intervals of an angle of 20°, which is the maximum allowable angle, at a distance of 1 m away from the center of an arc of an angle of 120°. Alternatively, in order to acquire a full parallax digital holographic portrait photograph, a plurality of cameras may be horizontally arranged at the interval of the maximum allowable angle at a specific distance away from the center of an arc of a specific angle, and also arranged at intervals of the maximum allowable angle at two additional heights that are vertically separated from both sides of the initial height in the vertical direction. For example, at a distance of 1 m away from the center of each of arcs of 60° located at three heights, four cameras may be horizontally arranged at intervals of an angle of 20°, the maximum allowable angle, thus, a total of 12 cameras may be arranged.

Preferably, the hologram recorder 220 may record images using the same set of HD cameras (Universal Serial Bus (USB) cameras) connected to a computer via a USB, and the model may be uniformly illuminated through a soft-box, and the rotation axis may be placed at eye level.

The hologram recorder 220 records a holographic portrait photograph by interpolating a plurality of images (step S340). Here, image interpolation refers to synthesizing intermediate images between two input images, and may be performed using an existing neural network image interpolation algorithm. Through image interpolation, images of various viewpoints of a hologram may be generated, and through this, a three-dimensional hologram with a high sense of immersion may be generated.

Preferably, the hologram recorder 220 may acquire images from a plurality of cameras arranged in the horizontal direction. The hologram recorder 220 may resize, rotate, and interpolate the acquired images through the neural network image interpolation algorithm to generate horizontally interpolated images between the images. Then, the hologram recorder 220 may record a half-parallax digital holographic portrait photograph using the horizontally interpolated images.

Preferably, the hologram recorder 220 may acquire images from a plurality of cameras arranged in the vertical direction. The hologram recorder 220 may resize, rotate, and interpolate the acquired images through the neural network image interpolation algorithm to generate vertically interpolated images between the images. Then, the hologram recorder 220 may record a full parallax digital holographic portrait photograph using the vertically interpolated images and the horizontally interpolated images.

Figure 8:
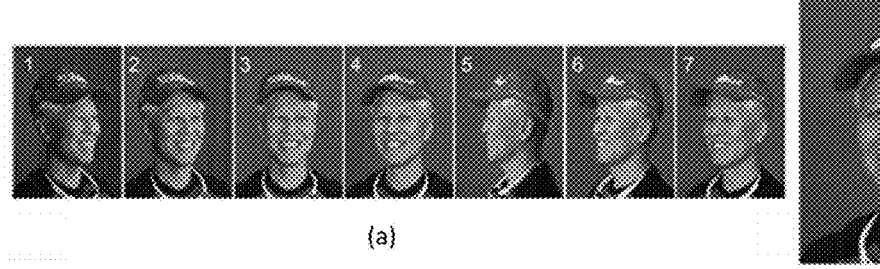
FIGS. 8 and 9 are exemplary diagrams for describing digital holographic portrait photographs recorded according to an embodiment.

In one embodiment, FIG. 8 shows a digital holographic portrait photograph recorded using images acquired from a plurality of cameras arranged as shown in FIG. 6. Seven images may be simultaneously recorded within 100 ms by seven cameras arranged every 20° as shown in FIG. 8A.

Here, the model, the subject of the portrait photograph, is uniformly illuminated by three lamps in a ¾ posture, with the head positioned midway between the front and side views, and the gaze directed toward the central camera. Preferably, the hologram recorder 220 may generate horizontally interpolated images such that 128 images are interpolated between frames within 5 minutes, finally acquiring a total of 768 images. More specifically, a total of six zones may be segmented based on seven horizontal images on the horizontal axis acquired by seven cameras, and 128 horizontally interpolated images may be generated in each of the zones. Accordingly, a total of 768 horizontally interpolated images corresponding to 128×6 may be generated. Here, the number of images acquired through the actual cameras is 7, which is 0.92% of the total number of images. Then, the hologram recorder 220 may calculate a hogel using the 768 images and record a half-parallax digital holographic portrait photograph as shown in FIG. 8B. Referring to FIG. 8B, for a finally acquired 15×20 cm sealed full-color 120° half-parallax CHIMERA portrait photograph, it can be seen that the image is obtained by being illuminated with an RGB LED lamp at an appropriate distance, and upon comparison of FIG. 8A and FIG. 8B, the head of the model is reconstructed. Also, it can be seen that the model's eyes are kept still and every part of the face, clothes and hat are perfectly reconstructed. In addition, at a resolution of 250 µm, the lattice pattern is hardly visible to the naked eye, and the viewpoint does not change even with a vertical movement for the half parallax. That is, according to the present invention, a sharper and clearer image is generated in a smaller size, and thus the issue of causing a visible lattice pattern like a pixel in the conventional technology may be resolved, and in the case of half-parallax, since a change in viewpoint only occurs in a horizontal structure, a movement in the vertical direction does not cause a change in the image.

Figure 7:
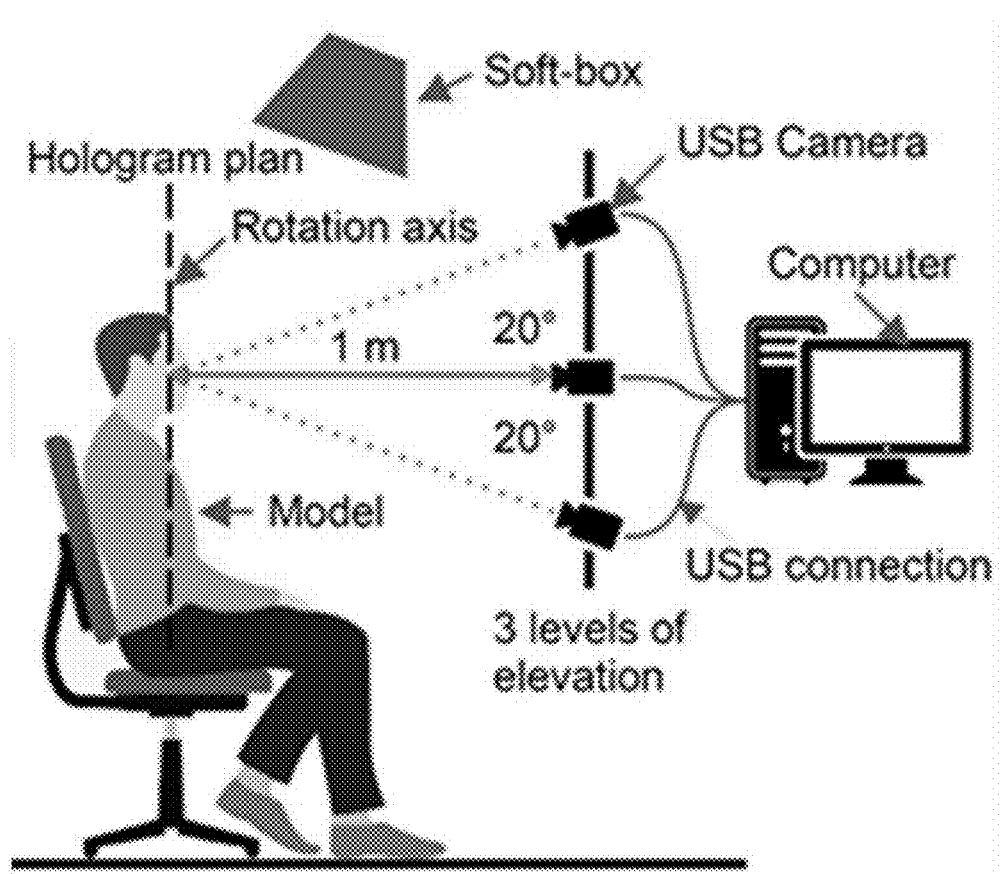
Figure 9:
Figure 9:
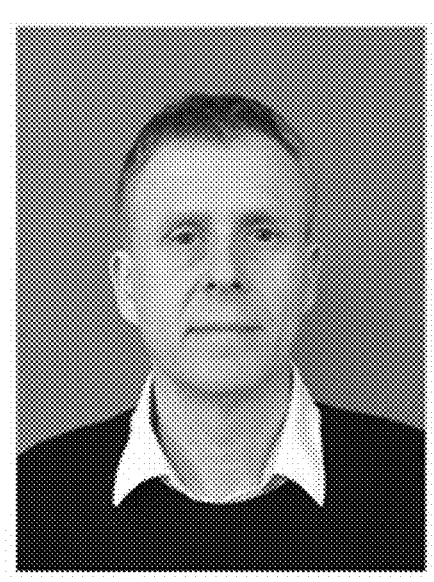

In another embodiment, FIG. 9 shows a digital holographic portrait photograph recorded using images acquired from a plurality of cameras arranged as shown in FIG. 7. Twelve images may be simultaneously recorded within 300 ms by twelve cameras arranged every 20° at three heights as shown in FIG. 9A. Preferably, the hologram recorder 220 may, when four horizontal images on the horizontal axis and three vertical images on the vertical axis are referred to as reference images, horizontally interpolate between horizontal images in each of the virtual quadrangles each having a corresponding one of the reference images as a vertex to generate 128 horizontally interpolated images, and vertically interpolate between vertical images in each of the virtual quadrangles each having a corresponding one of the reference images as a vertex to generate 64 vertically interpolated images. That is, 128×64 interpolated images may be acquired in one virtual quadrangle by filling the surface of the one virtual quadrangle, and since a total of six virtual quadrangles are generated, a total of 49,152 images corresponding to 128×64×6 may be acquired. Among the images, the number of images captured by actual cameras is 12, corresponding to 0.0244% of the total images, and the image interpolation takes four hours. Then, the hologram recorder 220 may calculate a hogel using the 49,152 horizontally and vertically interpolated images, and then record a ultra realistic full-color 120° full-parallax CHIMERA portrait photograph of a size 15×20 cm as shown in FIG. 9B. Referring to FIG. 9B, it can be seen that the model is more realistically reconstructed with the added vertical parallax, in which the horizontal parallax of the final hologram corresponds to 60° and the vertical angle corresponds to 40°.

Preferably, the present invention provides a new, simple and rapid method of recording a digital holographic portrait photograph through a combination of CHIMERA technology and neural network image interpolation, and provides better results compared to the conventional technology in terms of color and parallax, thus satisfying the expectations of the general public, and being capable of wide distribution of holographic portraits.

Meanwhile, the operations of a method or algorithm described in connection with an embodiment of the present invention may be implemented directly by hardware, by a software module executed by hardware, or by a combination of hardware and a software module. The software module may reside in a random access memory (RAM), a read only memory (ROM), an erasable programmable ROM (EPROM), an electrically erasable programmable ROM (EEPROM), a flash memory, a hard disk, a removable disk, a compact disc read only memory (CD-ROM), or any other type of computer-readable recording medium well known in the art to which the present invention pertains.

The components of the present invention may be implemented as a program (or application) to be executed in combination with a computer, which is hardware, and may be stored in a medium. The components of the present invention may be implemented with software programming or software components, and similarly, embodiments may be implemented with programming or scripting languages, such as C, C++, Java, assembler, etc., including various algorithms implemented in a combination of data structures, processes, routines or other programming components. Functional aspects may be implemented with algorithms running on one or more processors.

As is apparent from the above, as described above, according to the present invention, the number of cameras can be limited as much as possible using a neural network image interpolation method, and recording can be performed in a simple manner without requiring expensive laser equipment or advanced hologram technology, so that a holographic portrait can be developed on a large scale and disseminated to the public. In addition, images can be recorded in a bright environment, and the recorded photographs can be immediately viewed on a computer screen.

The effects of the present invention are not limited to those described above, and other effects not described above will be clearly understood by those skilled in the art from the above detailed description.

Although exemplary embodiments of the method and apparatus for recording a digital holographic portrait photograph according to the present invention have been described above, the present invention is not limited thereto, and various modifications are possible within the scope of the claims and the detailed description of the invention and the accompanying drawings, and they may also belong to the scope of the present invention.

What is claimed is:

1. A method of recording a digital holographic portrait photograph, which is performed by an apparatus for recording a digital holographic portrait photograph, the method comprising:
   performing a preliminary test using a plurality of cameras arranged at a specific rotation angle;
   determining a maximum allowable angle between the cameras through the preliminary test;
   acquiring a plurality of images using the plurality of cameras arranged at the maximum allowable angle; and interpolating the plurality of images to record a holographic portrait photograph, wherein the determining the maximum allowable angle includes:
   comparing pixel colors between an acquired image and an actual image generated through the preliminary test;
   converting a color of an area in which a difference in pixel colors in the acquired image and the actual image is greater than or equal to a preset reference to a specific color;
   calculating an accuracy of the acquired image; and
   determining the maximum allowable angle between two adjacent cameras in the plurality of cameras based on the area converted to the specific color and the accuracy.

2. The method of claim 1, wherein the performing the preliminary test includes performing the preliminary test using a 3D computer-generated image head model having a rotation angle in a range of 5° to 60° and a 3D computer graphics program.

3. The method of claim 1, where the performing the preliminary test includes:
   generating interpolated images while changing a rotation angle between frames of the two adjacent cameras in the plurality of cameras; and
   generating acquired images for each rotation angle using the interpolated images.

4. The method of claim 1, wherein the maximum allowable angle is 20°.

5. The method of claim 1, wherein in the acquiring the plurality of images, the plurality of cameras are separated at the maximum allowable angle in a range of a specific arc angle to be arranged in a horizontal direction or to be arranged in a vertical direction.

6. The method of claim 5, wherein the interpolating the plurality of images includes:
   acquiring images from the plurality of cameras arranged in the horizontal direction;
   interpolating the acquired images to generate horizontally interpolated images between the images; and
   recording a half-parallax digital holographic portrait photograph using the horizontally interpolated images.

7. The method of claim 6, wherein the interpolating the plurality of images includes:
   acquiring images from the plurality of cameras arranged in the vertical direction;
   interpolating the acquired images to generate vertically interpolated images between the images; and
   recording a full-parallax digital holographic portrait photograph using the vertically interpolated images and the horizontally interpolated images.

8. An apparatus for recording a digital holographic portrait photograph, the apparatus comprising:
   a camera array including a plurality of cameras arranged at a variable rotation angle;
   at least one processor electrically connected to the camera array; and
   a memory storing instructions executable by the at least one processor,
   wherein the at least one processor, when executing the instructions, is configured to:
   perform a preliminary test using the camera array including a plurality of cameras arranged at a specific rotation angle;
   compare pixel colors between an acquired image and an actual image generated through the preliminary test;

convert a color of an area in which a difference in pixel colors in the acquired image and the actual image is greater than or equal to a preset reference to a specific color;

calculate an accuracy of the acquired image;

determining the maximum allowable angle between two adjacent cameras in the plurality of cameras based on the area converted to the specific color and the accuracy;

acquire a plurality of images using the camera array including a plurality of cameras arranged at the maximum allowable angle; and interpolate the plurality of images to record a holographic portrait photograph.

9. A computer program recorded in a non-transitory computer readable medium, which performs the method of claim 1 when instructions of the computer program are executed by a processor.

\* \* \* \* \*